No. 869,631. PATENTED OCT. 29, 1907.
J. M. HADDOCK.
WINDOW TIGHTENER.
APPLICATION FILED DEC. 29, 1906.
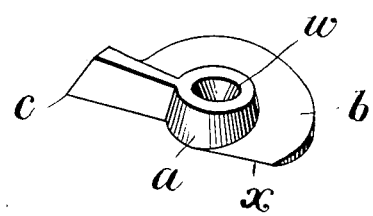
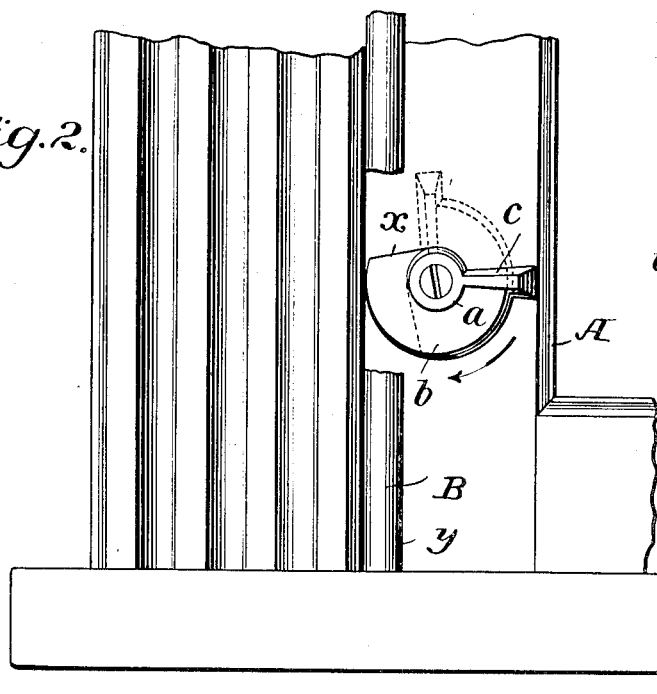
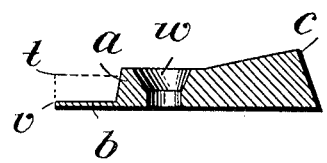
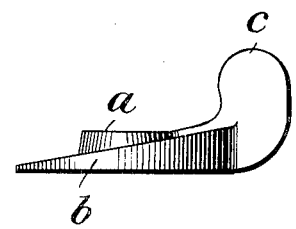
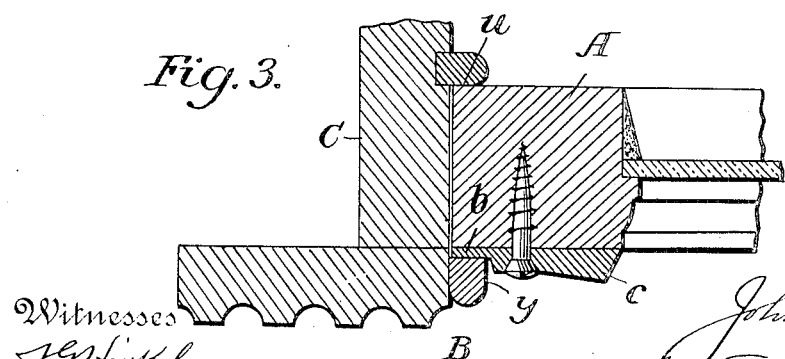
Inventor
John M. Haddick
by Foster Freeman & Watson
Attorneys
Witnesses

UNITED STATES PATENT OFFICE.

JOHN M. HADDOCK, OF BEDFORD, IOWA.

WINDOW-TIGHTENER.

No. 869,631.   Specification of Letters Patent.   Patented Oct. 29, 1907.

Application filed December 29, 1906. Serial No. 350,033.

*To all whom it may concern:*

Be it known that I, JOHN M. HADDOCK, a citizen of the United States, and resident of Bedford, Taylor county, State of Iowa, have invented certain new and useful Improvements in Window-Tighteners, of which the following is a specification.

My invention relates to sash tighteners and consists of a tightener having a perforated hub and an extended wedge-like wing and handle as fully set forth hereinafter and as illustrated in the accompanying drawing, in which, Figure 1 is a perspective view of my improved tightener; Fig. 2 is a sectional elevation showing the same applied to a sash; Fig. 3 a transverse section of Fig. 2; Fig. 4 a transverse section of the tightener alone; Fig. 5 a side view showing a different form of handle.

My improved tightener for sash consists of a single element having a hub $a$ centrally perforated, and a wing $b$ surrounding the hub and of gradually increasing thickness from a lateral edge $x$ to the point where it joins a handle $c$. This wing is flush at the under side with the bottom of the hub and the bottom face of the wing may be on the same plane, but the upper surface of the wing is on an ascending plane so that the wing constitutes in fact a curved wedge with the hub as a center, the upper end of the hub extending above the inclined face of the wing at all points. The device thus constructed is so set upon a sash A that the wing will extend between the face of the sash and the inner face of the sealing strip B, but with the side of the hub $a$ in close proximity to the side face $y$ of said strip and a screw is then inserted through the opening $w$ so as to secure the device to the sash but without preventing it from turning freely about and on said screw.

It will be noted that the wing $b$ only encircles the hub for a little more than half the circumference of the latter and that as a result when the device is turned to the position shown in dotted lines, Fig. 2, its wing will be wholly removed from between the sash and sealing strip, but on turning the device in the direction of the arrow, the wing will be inserted between the two until the part of the wing so inserted fills the space between the sash and strip. By application of sufficient force to the handle the wing may be thus wedged so firmly between the two faces that the sash is forced out against the face $u$ of the frame C, and all play between the two is thus prevented.

Further, it will be seen that as thus wedged in position, the device is held from turning and that the weight of the arm or handle $c$ tends further to hold it in place, thus dispensing with springs or other retaining means.

Owing to the wedge like character of the curved wing, it will be seen that at all points on any radial section the bottom and outer faces are parallel so as to be parallel in cross section (Fig. 3) with the faces between which it extends, while the inclination of the upper face is such that the part of the wing above that shown in cross section Fig. 3, will be forced into close contact with the faces of the sash and strip the wood yielding sufficiently to secure a close face contact at all points. As a material result the wing is adapted to arrangements where the spaces between the sash and strip are as small as indicated at $v$, Fig. 4, or as large as the distance between $v$, $t$, in said figure.

The hub serves not only as a receptacle for the securing screw but also when set as described any side play of the sash is prevented by the contact of the side of the hub and the face $y$ of the strip B.

If desired the handle $c$ may be extended as shown in Fig. 5. I have shown the device for use at one side of the sash, that for the other side will of course have the wing reversed.

I claim as my invention,

The herein described sash tightener consisting of a perforated hub, a handle projecting radially from the hub, and a wing extending concentrically with and partially about the hub from one side of the handle, said wing decreasing gradually in thickness from the handle to a thin edge at its other end, whereby the wing forms a curved wedge having its outer face inclined longitudinally, said wedge being of such length that when in one position, relative to its pivotal support on a window sash, it will be out of contact with the window frame and, as the hub is turned, is adapted to extend between the sash and a member on the frame to hold the sash against vibration.

In testimony whereof I affix my signature in presence of two witnesses.

JOHN M. HADDOCK.

Witnesses:
M. C. HADDOCK,
ELIZABETH CARRIGAN.